US012761898B2

(12) United States Patent
Takahashi et al.

(10) Patent No.: US 12,761,898 B2
(45) Date of Patent: Oct. 13, 2026

(54) SYSTEM FOR DISTRIBUTING UPDATE DATA OF SOFTWARE FOR AN IN-VEHICLE DEVICE

(71) Applicant: TOYOTA JIDOSHA KABUSHIKI KAISHA, Toyota (JP)

(72) Inventors: Shuhei Takahashi, Kariya (JP); Yuzo Harata, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 283 days.

(21) Appl. No.: 18/588,366

(22) Filed: Feb. 27, 2024

(65) Prior Publication Data

US 2024/0311129 A1 Sep. 19, 2024

(30) Foreign Application Priority Data

Mar. 15, 2023 (JP) ................................. 2023-040826

(51) Int. Cl.
*G06F 8/65* (2018.01)
*H04L 9/14* (2006.01)
*H04L 9/32* (2006.01)

(52) U.S. Cl.
CPC .................. *G06F 8/65* (2013.01); *H04L 9/14* (2013.01); *H04L 9/3247* (2013.01)

(58) Field of Classification Search
CPC ..................................... G06F 8/65; H04L 9/14
USPC .......................................................... 717/172
See application file for complete search history.

(56) References Cited

U.S. PATENT DOCUMENTS

| | | | | |
|---|---|---|---|---|
| 10,956,147 B2 * | 3/2021 | Kiyama | G06F 11/327 |
| 11,516,194 B2 * | 11/2022 | Kim | H04W 12/041 |
| 11,750,399 B2 * | 9/2023 | Maass | H04L 67/10 713/171 |
| 2020/0177561 A1 * | 6/2020 | Kruger | H04L 63/061 |
| 2022/0131709 A1 * | 4/2022 | Nix | H04L 9/3252 |
| 2023/0004373 A1 * | 1/2023 | Yamamoto | G06F 8/65 |
| 2023/0040468 A1 * | 2/2023 | Buendgen | H04L 9/085 |
| 2024/0267221 A1 * | 8/2024 | Yoshimi | H04L 9/302 |

FOREIGN PATENT DOCUMENTS

| | | |
|---|---|---|
| JP | 2004-326689 A | 11/2004 |
| JP | 2022-507151 A | 1/2022 |
| WO | 2020101936 A1 | 5/2020 |
| WO | 2023280546 A1 | 1/2023 |

OTHER PUBLICATIONS

Hu, Qiang, and Feng Luo. "Review of secure communication approaches for in-vehicle network." International Journal of Automotive Technology 19.5 (2018): pp. 879-894. (Year: 2018).*

(Continued)

*Primary Examiner* — Satish Rampuria
(74) *Attorney, Agent, or Firm* — Oliff PLC

(57) ABSTRACT

A distribution server distributes update data of software for an in-vehicle device to vehicles via a wireless communication network. The distribution server includes a processor. The processor distributes the update data encrypted with a common key to the vehicles. The processor transmits the common key encrypted by a session key method to each of the vehicles.

5 Claims, 3 Drawing Sheets

(56) References Cited

OTHER PUBLICATIONS

Mahmud, Syed Masud, Shobhit Shanker, and Irina Hossain. "Secure software upload in an intelligent vehicle via wireless communication links." IEEE Proceedings. Intelligent Vehicles Symposium, 2005.. IEEE, 2005.pp. 588-593. (Year: 2005).*
Mahmud, Syed Masud, and Shobhit Shanker. "In-vehicle secure wireless personal area network (SWPAN)." IEEE Transactions on Vehicular Technology 55.3 (2006): pp. 1051-1061. (Year: 2006).*
Scordino, Claudio, Angela Gonzalez Mariño, and Francesc Fons. "Hardware acceleration of data distribution service (DDS) for automotive communication and computing." IEEE Access 10 (2022): pp. 109626-109651. (Year: 2022).*
Huang, Wei, et al. "QoE-based resource allocation for heterogeneous multi-radio communication in software-defined vehicle networks." IEEE Access 6 (2018): pp. 3387-3399. (Year: 2018).*
Nkenyereye, Lionel, et al. "Software defined network-based multi-access edge framework for vehicular networks." IEEE Access 8 (2019): pp. 4220-4234. (Year: 2019).*
English Translation of Mar. 10, 2026 Office Action issued in JP Patent Application No. 2023-040826.
Mizoguchi et al., "Implementation of Secure Remote Reprogramming Schemes," Apr. 2019, Computer Security Symposium 2016, 2E1-2, pp. 379-383 (Oct. 4, 2016) [Discussed in NPL Cite No. 1; English abstract attached hereto].

* cited by examiner

SYSTEM FOR DISTRIBUTING UPDATE DATA OF SOFTWARE FOR AN IN-VEHICLE DEVICE

CROSS-REFERENCE TO RELATED APPLICATION

This application claims priority to Japanese Patent Application No. 2023-040826 filed on Mar. 15, 2023 incorporated herein by reference in its entirety.

BACKGROUND

1. Technical Field

The present disclosure relates to a distribution server that distributes update data of software for an in-vehicle device.

2. Description of Related Art

Japanese Unexamined Patent Application Publication No. 2004-326689 (JP 2004-326689 A) describes a system in which update data of software for an in-vehicle device is distributed via a wireless communication network.

In order to prevent eavesdropping and tampering, it is necessary to encrypt and distribute the update data. In a common key encryption method by using the same encryption key for encryption and decryption of the update data, in order to ensure secrecy of the update data, a communication path with a possibility of eavesdropping cannot be used for sharing the encryption key. In contrast, when the distribution server and a vehicle share the encryption key by a session key method, data to be distributed may be different for each vehicle.

SUMMARY

According to an aspect of the present disclosure, a distribution server distributes update data of software for an in-vehicle device to vehicles via a wireless communication network. The distribution server includes a processor. The processor is configured to distribute the update data encrypted with a common key to the vehicles. The processor is configured to transmit the common key encrypted by a session key method to each of the vehicles.

The distribution server has an effect that the distribution of the update data of the software for the in-vehicle device to the vehicles can be executed securely and easily.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
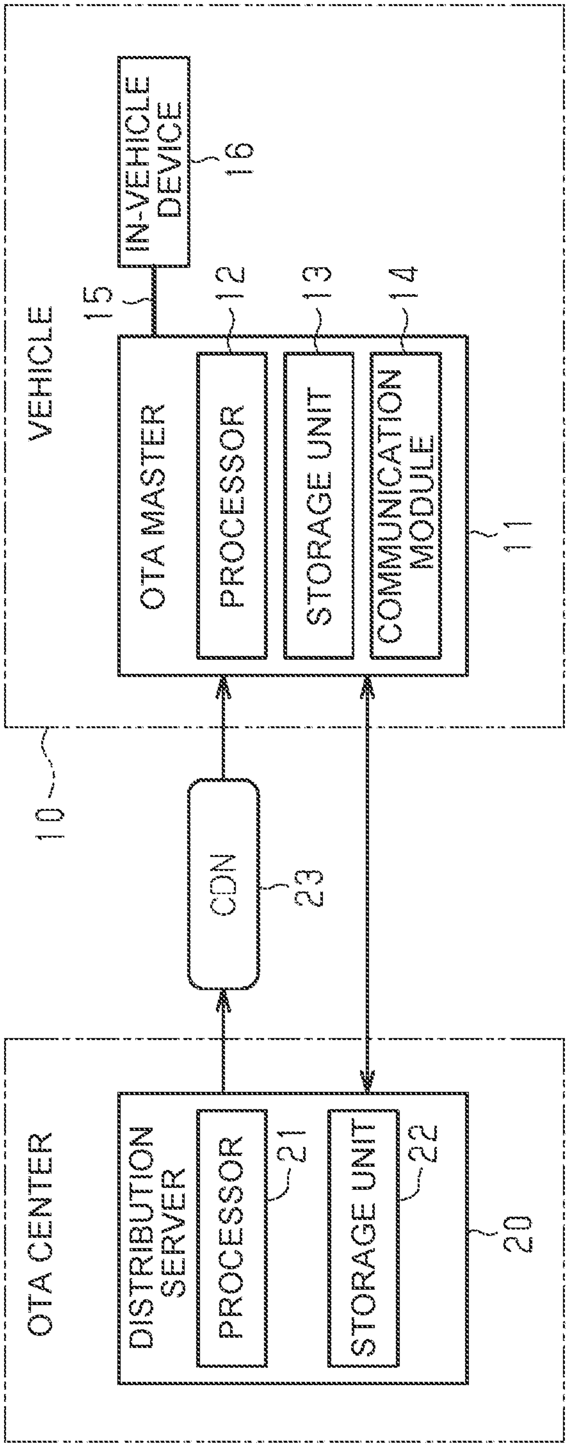
FIG. 1 is a diagram schematically showing a configuration of a distribution server according to a first embodiment.

Hereinafter, a first embodiment of a distribution server will be described in detail with reference to FIGS. 1 and 2. A distribution server 20 of the present embodiment is configured as a server device that distributes update data of software for an in-vehicle device 16 mounted on a vehicle 10.

Configuration of Distribution Server 20

The vehicle 10 to which the distribution server 20 distributes the update data includes an over-the-air (OTA) master 11 that manages update of the software for the in-vehicle device 16. The OTA master 11 is configured as an electronic control unit including a processor 12, a storage unit 13, and a communication module 14. The processor 12 is a processing circuit that executes a program, thereby performing processing for managing software update. The storage unit 13 is a storage that stores a program and data for managing the software update. The communication module 14 is a device for performing communication with outside of the vehicle via a mobile communication network and the like. The OTA master 11 is connected to the in-vehicle device 16 of which software is to be updated via an in-vehicle network 15. Examples of the in-vehicle device 16 include various electronic control units, communication devices, sensors, and the like. The OTA master 11 is also one of the in-vehicle devices 16, and the OTA master 11 may be subject to update of the software due to the update data distributed by the distribution server 20.

The distribution server 20 is installed in an OTA center. The OTA center is a facility provided with equipment for distributing the update data of the software for the in-vehicle device 16 to the vehicle 10 via the wireless communication network. The distribution server 20 is the server device including a processor 21 and a storage unit 22. The storage unit 22 is a storage that stores a program and data for distributing the update data. The processor 21 is a processing circuit that reads and executes a program from the storage unit 22. The distribution server 20 is configured to perform communication with the OTA master 11 of the vehicle 10 via the mobile communication network and the like. Also, the distribution server 20 is configured to be able to perform the distribution of data to the vehicle 10 via a content distribution network (CDN) 23.

Distribution of Update Data

Figure 2:
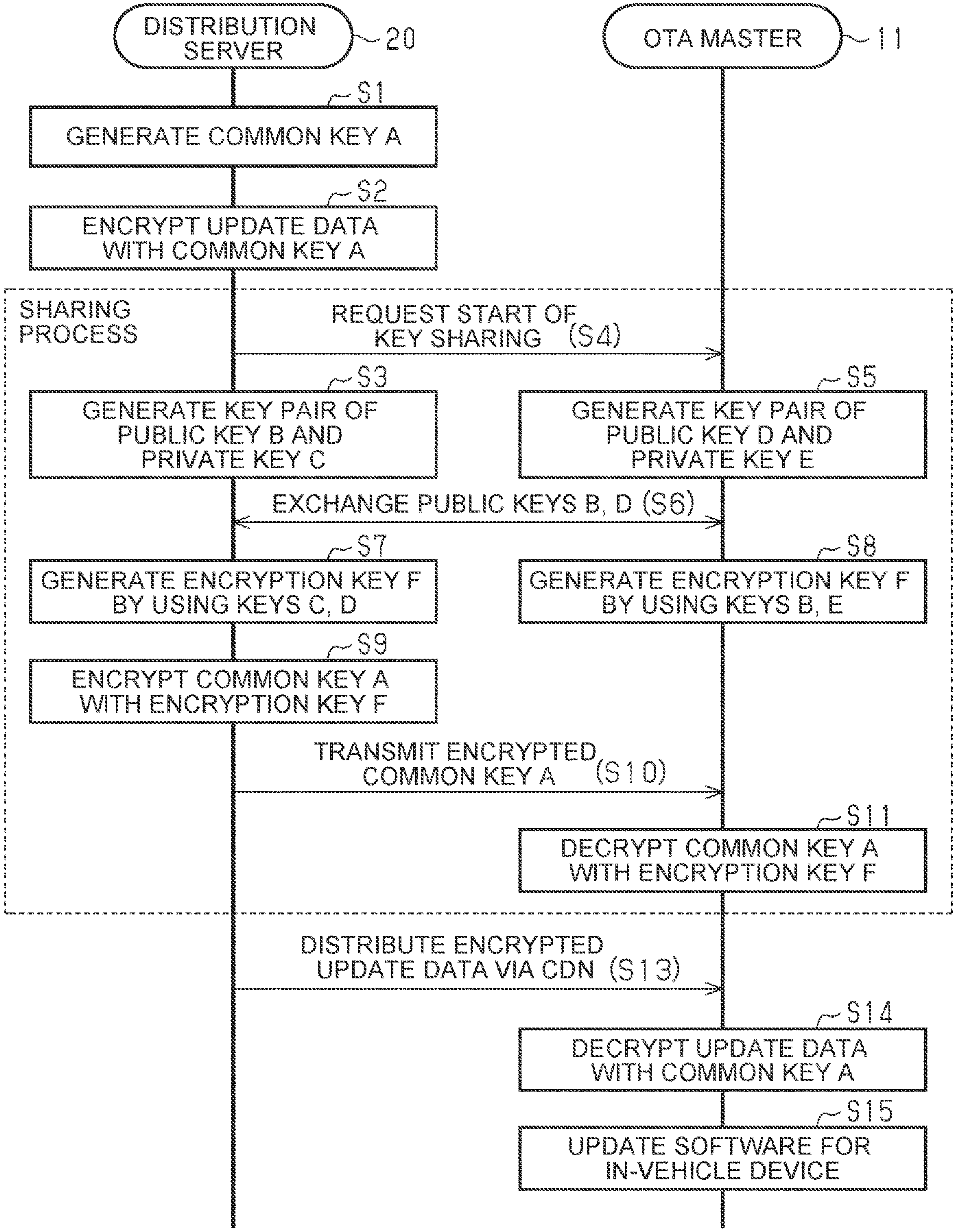
FIG. 2 is a sequence diagram showing a flow of processing related to distribution of update data in the distribution server according to the first embodiment.

FIG. 2 shows a flow of processing related to the distribution of the update data by the distribution server 20. The distribution server 20 executes generation of a common key A (S1) and the encryption of the update data by using the common key A (S2) as a preparation for the distribution. The common key A is an encryption key of a common key encryption method such as an advanced encryption standard (AES) method. The distribution server 20 newly generates the common key A for each distribution of the update data. That is, the distribution server 20 uses a different key as the common key A for each distribution of the update data.

Then, the distribution server 20 executes a sharing process for sharing the common key A with each vehicle 10 to which the update data is to be distributed. The distribution server 20 executes the sharing process for each of the vehicles 10. During the sharing process, the distribution server 20 generates a key pair of a public key B and a private key C (S3). Also, in the sharing process, the distribution server 20 requests the OTA master 11 of the vehicle 10 to start the sharing process (S4). In response to this request, the OTA master 11 generates a key pair of a public key D and a private key E (S5). Then, the distribution server 20 and the OTA master 11 exchange the public keys B, D with each other (S6).

Next, the distribution server 20 generates an encryption key F by using the private key C generated by itself and the public key D received from the OTA master 11 (S7). Also, the OTA master 11 generates an encryption key F by using the private key E generated by itself and the public key B received from the distribution server 20 (S8). The generation of the key pairs in S3, S5 and the generation of the encryption keys Fin S7, S8 are performed according to a Diffie-Hellman key exchange (DHE) method or an elliptic curve Diffie-Hellman key exchange (ECDHE) method. DHE represents temporary Diffie-Hellman key sharing. ECDHE represents temporary elliptic curve Diffie-Hellman key sharing. Therefore, the encryption key F generated by each of S7, S8 is the same.

Thereafter, the distribution server 20 encrypts the common key A with the encryption key F (S9) and transmits the encrypted common key A to the OTA master 11 (S10). The OTA master 11 obtains the common key A by decrypting the encrypted common key A by using the encryption key F (S11). Thus, the sharing process of the common key A is completed. The encryption key F is used only to transmit the common key A once. Therefore, the encryption of the common key A by the distribution server 20 is performed by the session key method.

The distribution server 20 distributes the update data that is encrypted in S2 to each vehicle 10 via the content distribution network 23 (S13). The OTA master 11 decrypts the encrypted update data by using the common key A (S14) and updates the software for the in-vehicle device 16 (S15).

Actions and Effects of Embodiment

The action and effect of the present embodiment will be described. The distribution server 20 distributes the update data of the software for the in-vehicle device 16 to the vehicles 10 via the wireless communication network. At the time of the distribution, the distribution server 20 distributes the update data that is encrypted with the common key A to the vehicles 10. Further, the distribution server 20 transmits the common key A that is encrypted by the session key method to each of the vehicles 10.

In the present embodiment, since the update data that is encrypted with the same common key A is distributed to all of the vehicles 10 to which the update data is to be distributed, it is not necessary to encrypt the update data for each of the vehicles 10. In addition, distribution data to each vehicle 10 is the same. Therefore, a load of the distribution server 20 for encrypting the update data and traffic of a communication network for distributing the update data can be reduced. Note that in the present embodiment, it is necessary to encrypt and transmit the common key A for each of the vehicles 10. However, since data of the common key A is smaller than data of the update data, the load of the distribution server 20 for the encryption and an increase in the traffic of the communication network for the transmission are limited. Further, in the present embodiment, the common key A that is encrypted by the session key method is transmitted to the vehicle 10. Therefore, it is possible to secure a forward secrecy of the common key A and thus a forward secrecy of the update data that is encrypted by the common key A as well. As described above, the distribution server 20 of the present embodiment has an effect that the distribution of the update data of the software for the in-vehicle device 16 to the vehicles 10 can be executed securely and easily.

According to the distribution server 20 of the present embodiment described above, the following effects can be further achieved. (1) Since the forward secrecy of the update data can be ensured, a line having the possibility of being eavesdropped can be used for the distribution of the update data.

(2) The distribution server 20 uses a different key as the common key A for each distribution of the update data. Therefore, the secrecy of the common key A is increased. (3) The distribution server 20 performs the distribution of the encrypted update data via the content distribution network 23. Therefore, the load of the distribution server 20 that is required for the distribution of the update data and the traffic of a communication line that is used for the distribution can be suppressed.

Second Embodiment

Next, a second embodiment of the distribution server 20 will be described in detail with reference to FIGS. 1 to 3. The present embodiment and the first embodiment differ from each other only in the sharing process of the common key A, and other parts such as a hardware configuration are common. In the present embodiment, configurations that are common to the above embodiment are designated by the same reference signs, and detailed explanation thereof will be omitted.

As described above, the distribution server 20 executes the encryption of the common key A by using the encryption key F shared with the vehicle 10 via the exchange of the public keys B, D by the session key method. The distribution server 20 of the present embodiment is configured to execute the key exchange of the public keys B, D with a digital signature.

Figure 3:
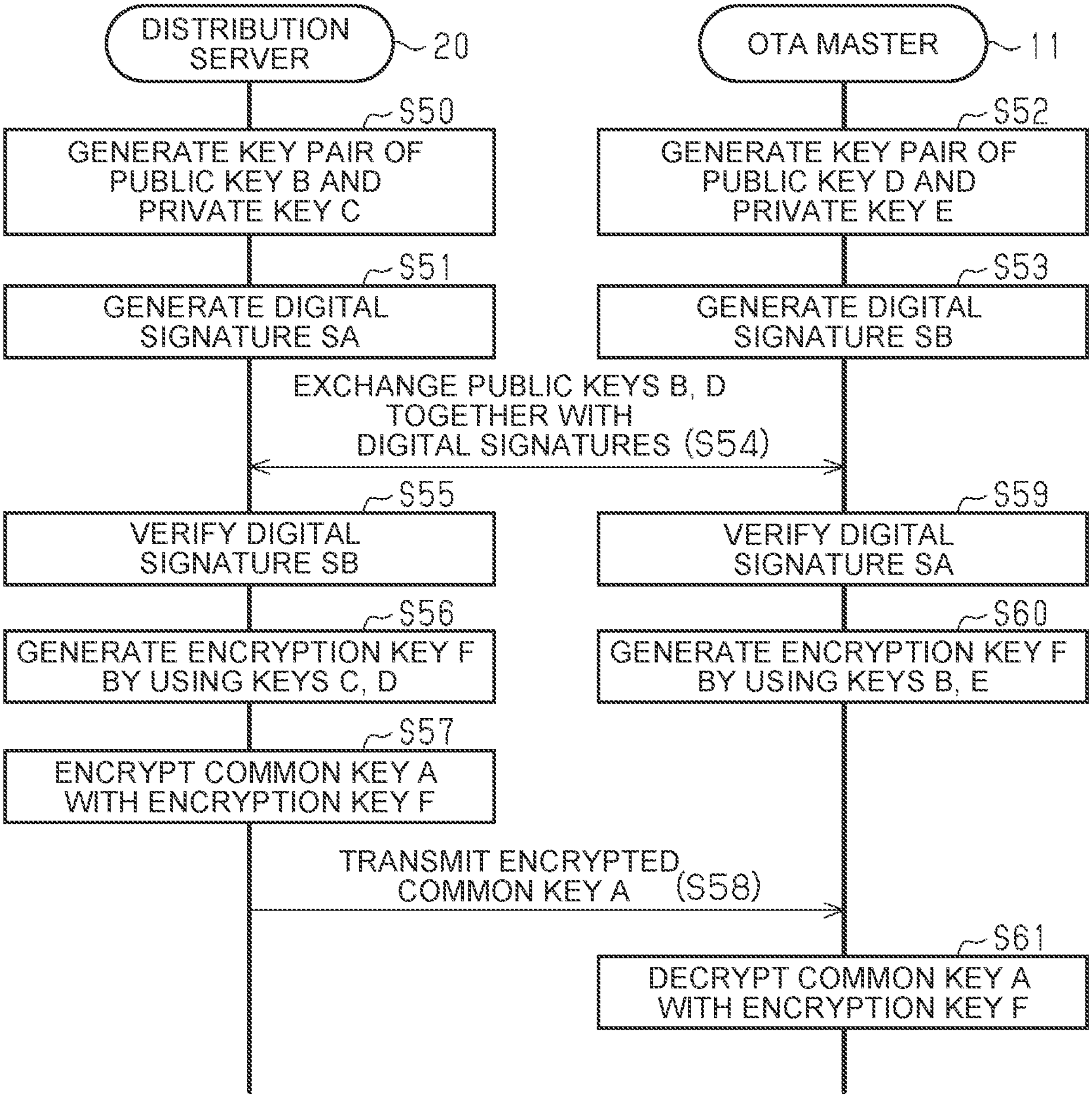
FIG. 3 is a sequence diagram showing a flow of processing of a sharing process of a common key in the distribution server according to a second embodiment.

FIG. 3 shows a flow of processing of the sharing process of the common key A in the distribution server 20 of the present embodiment. During the sharing process of the common key A, the distribution server 20 generates the key pair of the public key B and the private key C according to the DHE method or the ECDHE method (S50). Further, the distribution server 20 generates a digital signature SA (S51). Similarly, the OTA master 11 generates the key pair of the public key D and the private key E according to the DHE method or the ECDHE method (S52) and generates a digital signature SB (S53). Then, the distribution server 20 and the OTA master 11 exchange the digital signatures SA, SB and the public keys B, D (S54). Specifically, the distribution server 20 transmits the public key B together with the digital signature SA to the OTA master 11, and the OTA master 11 transmits the public key D together with the digital signature SB to the distribution server 20.

Then, the distribution server 20 verifies whether the public key D has been transmitted from a correct party by using the received digital signature SB (S55). Then, the distribution server 20 executes subsequent processing only when it is verified that a transmission source is correct. The distribution server 20, in this case, generates the encryption key F by using the private key C generated by itself and the public key D received from the OTA master 11 (S56). Then, the distribution server 20 encrypts the common key A with the encryption key F (S57) and transmits the encrypted common key A to the OTA master 11 (S58).

Similarly, the OTA master 11 verifies whether the public key B has been transmitted from a correct party by using the received digital signature SA (S59). Then, the OTA master 11 executes subsequent processing only when it is verified that the transmission source is correct. The OTA master 11, in this case, generates the encryption key F by using the private key E generated by itself and the public key B received from the distribution server 20 (S60). Then, the OTA master 11 decrypts the common key A received from the distribution server 20 by using the encryption key F (S61).

Verifying the digital signatures SA, SB is performed, for example, as follows. In advance, the distribution server 20 and each of the vehicles 10 are provided with the key pair of the public key and the private key in accordance with a public key method such as Rivest Shamir Adleman (RSA). The distribution server 20 stores its own private key V and a public key Y of each vehicle 10. Also, the OTA master 11 of each vehicle 10 stores its own private key W and a public key X of the distribution server 20.

In the sharing process of the common key A, the distribution server 20 calculates a hash value of the public key B to be exchanged with the OTA master 11. Then, the distribution server 20 generates the digital signature SA obtained by encrypting the hash value with the private key V. When the OTA master 11 receives the digital signature SA together with the public key B, the OTA master 11 decrypts the digital signature SA by using the public key X of the distribution server 20. Then, the OTA master 11 calculates the hash value of the public key B and determines that the transmission source of the public key B is correct when the value matches the value obtained by decrypting the digital signature SA.

Similarly, the OTA master 11 calculates a hash value of the public key D to be exchanged with the distribution server 20. Then, the OTA master 11 generates the digital signature SB obtained by encrypting the value with the private key V. When the distribution server 20 receives the digital signature SB together with the public key D, the distribution server 20 decrypts the digital signature SB by using the public key Y of the corresponding vehicle 10. Then, the distribution server 20 calculates the hash value of the public key D and determines that the transmission source of the public key D is correct when the value matches the value obtained by decrypting the digital signature SB. Note that calculation of each of the hash values is performed by using the same hash function.

In the distribution server 20 of the present embodiment, it is possible to verify exchange partners of the public keys B, D in the sharing process of the common key A. This makes the sharing process resistant to man-in-the-middle attack due to spoofing.

Other Embodiments

The above embodiments can be implemented with the following modifications. The above embodiments and the following modifications can be combined with each other within a technically consistent range to be implemented.

It is also possible to execute the sharing process of the common key A at a time different from that in FIG. 2. For example, the sharing process may be executed after the distribution of the update data (S13). Further, the encryption of the update data (S2) may be performed after the sharing process is completed.

The encryption of the common key A may be executed by using the session key method other than a key sharing by the DHE method or the ECDHE method. The distribution of the update data may be performed without using the content distribution network 23.

In the above embodiment, the common key A is changed every distribution of the update data, but the common key A may be changed at another timing, such as at a regular interval. The distribution server 20 may be constituted by a plurality of server devices, and the server devices may perform the distribution of the update data by dividing a work.

APPENDIXES

Appendix 1

A distribution server that distributes update data of software for an in-vehicle device to vehicles via a wireless communication network, wherein the distribution server executes: distribution of the update data encrypted with a common key to the vehicles, and transmission of the common key encrypted by a session key method to each of the vehicles.

Appendix 2

The distribution server according to appendix 1, wherein the distribution server uses a different key as the common key for each distribution of the update data.

Appendix 3

The distribution server according to appendix 1 or 2, wherein the distribution server distributes the update data via the content distribution network.

Appendix 4

The distribution server according to any one of appendixes 1 to 3, wherein the distribution server encrypts the common key using an encryption key shared with each of the vehicles via key exchange by the session key method and executes the key exchange with a digital signature.

Appendix 5

The distribution server according to any one of appendixes 1 to 4, wherein the distribution server encrypts the common key by the session key method using an encryption key shared by using a DHE method or a ECDHE method.

What is claimed is:

1. A distribution server that distributes update data of software for an in-vehicle device to vehicles via a wireless communication network, the distribution server comprising a processor configured to:

distribute the update data encrypted with a common key to the vehicles, the update data and the common key being identical for each of the vehicles for a given distribution of the update data; and transmit the common key encrypted by a session key with a session key method to each of the vehicles, the session key being a single-use key that is only used once to encrypt the common key and is different for each vehicle.

2. The distribution server according to claim 1, wherein the processor uses a different key as the common key for subsequent distributions of the update data.

3. The distribution server according to claim 1, wherein the processor distributes the update data via a content distribution network.

4. The distribution server according to claim 1, wherein:

the processor encrypts the common key using the session key shared with each of the vehicles via key exchange by the session key method; and the processor executes the key exchange with a digital signature.

5. The distribution server according to claim 1, wherein the processor encrypts the common key by the session key method using the session key shared by using a Diffie-Hellman key exchange (DHE) method or an elliptic curve Diffie-Hellman key exchange (ECDHE) method.

* * * * *